(12) United States Patent
Cherkassky (10) Patent No.: US 6,242,739 B1
(45) Date of Patent: Jun. 5, 2001

(54) METHOD AND APPARATUS FOR NON-DESTRUCTIVE DETERMINATION OF FILM THICKNESS AND DOPANT CONCENTRATION USING FOURIER TRANSFORM INFRARED SPECTROMETRY (76) Inventor: Alexander P. Cherkassky, 20408 Shore Harbor Dr. Apt. N, Germantown, MD (US) 20874

( * ) Notice: Subject to any disclaimer, the term of this patent is extended or adjusted under 35 U.S.C. 154(b) by 0 days.

(21) Appl. No.: 09/294,247

(22) Filed: Apr. 19, 1999

Related U.S. Application Data (60) Provisional application No. 60/082,639, filed on Apr. 21, 1998.

(51) Int. Cl.[7] .................................................. G01N 21/35
(52) U.S. Cl. ................................ 250/339.11; 250/339.08; 250/339.09; 250/341.3; 250/341.4; 250/341.5
(58) Field of Search ............................ 250/341.4, 341.3, 250/341.5, 339.08, 39.09, 339.11

(56) References Cited

U.S. PATENT DOCUMENTS

| 4,555,767 | 11/1985 | Case et al. . | |
| 4,625,114 | 11/1986 | Bosacchi et al. . | |
| 5,386,118 | 1/1995 | Kitagawara et al. . | |
| 5,604,581 | 2/1997 | Liu et al. . | |
| 5,900,633 | * | 5/1999 | Soloman et al. ................ 250/339.08 |

* cited by examiner

Primary Examiner—Constantine Hannaher
(74) Attorney, Agent, or Firm—O'Melveny & Myers LLP (57) ABSTRACT A method and apparatus for the determination of parameters of interests of a semiconductor sample is provided. For example, the thickness of an epitaxial or implanted layer, the thickness of a transition layer and the concentration of free carriers in a substrate layer may be determined without having to destroy the semiconductor sample in the process. In an embodiment, a method is provided for determining at least one parameter of a semiconductor. The method starts by measuring an experimental reflectance spectrum of the semiconductor. An analytical model of the semiconductor having a film layer, a transition layer and a substrate layer is then constructed. Next, optical constants n and k for the film layer, transition layer and substrate layer are expressed as a function of doping level. A profile of the transition layer is determined, and if an abrupt profile exists, the transition layer is not included in the semiconductor model. If a graded profile exists, the transition layer is further modeled as having a plurality of sections, wherein each of the sections is assigned an s-polarization matrix and a p-polarization matrix. An overall modeled reflectance spectrum is then calculated and the parameters therein are varied to achieve a best fit relationship with the experimental reflectance spectrum. Thus, the parameter of interest can be determined.

22 Claims, 6 Drawing Sheets

METHOD AND APPARATUS FOR NON-DESTRUCTIVE DETERMINATION OF FILM THICKNESS AND DOPANT CONCENTRATION USING FOURIER TRANSFORM INFRARED SPECTROMETRY

CROSS-REFERENCES TO RELATED APPLICATIONS

This application claims the benefit of U.S. Provisional Application No. 60/082,639 filed Apr. 21,1998, the disclosure of which is incorporated by reference.

FIELD OF THE INVENTION

This invention relates generally to the field of semiconductor metrology, and more particularly, to the use of infrared spectrometry to non-destructively determine depth profiles of doped semiconductors.

BACKGROUND OF THE INVENTION

The ability to non-destructively measure the thickness and dopant profiles in semiconductors has long been sought by the integrated circuit (IC) industry. In fact, dopant profile measurement techniques have been a subject of investigation for over 30 years. In one technique, referred to as Secondary Ion Mass Spectroscopy (SIMS), the dopant profile of a semiconductor is measured as it is incrementally destroyed layer by layer. As a result, a dopant profile is obtained, however, the semiconductor material is lost.

It is common knowledge in solid state physics that the introduction of dopants into a semiconductor alters its optical properties in the infrared spectral range due to the presence of free carriers. At the simplest conceptual level, free carriers contribute to the optical constants n and k as described by the well known Drude model. Thus far, optical measurement techniques can be classified into two categories, namely, the Infrared Reflectance (IR) technique and the Fourier Transform Infrared (FT-IR) Interferometry technique.

Infrared Reflectance (IR) Technique

The IR technique was first used in 1960 to measure the thickness of silicon epitaxial (epi) layers. The technique exploits the existence of optical contrast in the infrared spectrum due to different doping levels in a lightly doped epi-layer and a heavily doped substrate. The different doping levels cause interference when IR light is reflected from the surface of the sample. For an epi-layer exceeding 2 micrometers ($\mu$m) in thickness, the reflectance waveform produces oscillatory behavior allowing the film thickness to be derived from the distance between the adjacent interference fringes. The technique has a number of disadvantages, the main one of which is that the position of the interference fringes is strongly influenced by the substrate dopant concentration, as well as the disappearance of the fringes altogether for sub-1 $\mu$m epi-layers. There have been attempts to improve the technique by accounting for the phase changes upon the reflection at the epi/substrate interface. One theory calculated such changes using classical Boltzmann statistics, however the computations failed to agree with experimental results across the broad IR frequency range of 5–40 $\mu$m. The computations also failed to agree with experimental results wherein the phase shift correction is particularly significant for thin epi-layers. Attempts have also been made to extend the IR reflectance technique to thin (0.5 $\mu$m) epi-layers by comparing the Drude model with other known models. It was found that the Drude model is more applicable to epi-layers on heavily doped substrates, such as 2E19 cm$^{-3}$, while other models are more accurate for lightly doped substrates, such as 5E18 cm$^{-3}$. No model was able to adequately describe both cases. Currently, the IR technique is only applicable to the measurements of epi-layers thicker than 2 $\mu$m with substrate resistivity less than 0.02 $\Omega$-cm and epi-layer resistivity less than 0.1 $\Omega$-cm.

Fourier Transform Infrared (FT-IR) Interferometry Technique

The FT-IR technique has found wide-spread use as a powerful tool for chemical analysis of materials where various material properties can be inferred from their infrared absorbance spectra. The application of FT-IR for film thickness determination was introduced in 1972 for measurements of thin polymer films and has since been widely adopted by the IC industry as the standard method for epi-layer thickness measurements. Unlike the IR technique, which uses dispersive infrared spectrophotometry, this method uses FT-IR in an interferogram mode. An instrument implementing an FT-IR consists of a Michelson interferometer coupled to a computer system. A Michelson interferometer divides a beam of radiation from an incoherent infrared source into two paths and recombines them at a detector after a path difference has been introduced, creating a condition under which an interference between the two beams can occur. The intensity variation as a function of the path difference is captured by the detector and results in the interferogram.

A typical interferogram consists of a strong center burst and two similar smaller bursts positioned symmetrically to the sides of the center burst. The epi-layer thickness is determined according to the formula:

$$d = \frac{\Delta}{2n\cos\theta} \quad (1)$$

where d is the epi-layer thickness, 2$\Delta$ is the distance between the side-bursts in the interferograms (same as the path difference between the two beams), n is the refractive index of the epi-layer, and $\theta$ is the angle of refraction in the epi-layer. However, as the film thickness decreases, the side-bursts move into the strong center burst until they get completely obscured, making the epi-layer measurement by side-burst identification impossible. This occurs when the epi-layer thickness is reduced below approximately 1 $\mu$m. Attempts at extending the interferogram measurements to thinner films by utilizing a center-burst cancellation technique, wherein an interferogram of a matched substrate is subtracted from the initial measurement, have produced very limited success. Even if a perfectly matched substrate could be found, this still does not account for the secondary contribution to the center-burst formation due to the epi-layer presence, nor are the frequency responses of the instrument's optical and electronic components and the material properties taken into consideration. These items create phase shifts in the interferogram which influence the shape and absolute and relative positions of the side-bursts. Even in the cases where the film thickness is sufficient for side-burst identification, these phase shifts cause enough of an error to make film thickness measurements approaching 1 $\mu$m increasingly uncertain.

In view of the above, what is needed is an improved technique to obtain an accurate non-destructive measurement of film thickness or dopant concentrations of doped semiconductors. This includes such semiconductor structures as silicon epitaxial layers on silicon substrates where the epi-layer has a different doping level from the substrate, for example, an undoped or lightly doped epi-layer on a heavily doped substrate. The technique should also work for structures having an ion-implanted or diffused profile, where a layer of dopants is introduced into a semiconductor having a lighter dopant level, including such specific structures as buried layers and shallow junctions. In both of these examples, the improved technique should enable one to determine the thickness of the epitaxial or implanted layer, the thickness of the transition layer between the film and substrate, and the concentration of free carriers in the film and the substrate, without having to destroy the sample in the process. In addition, the technique should account for imperfections in the measuring device and yield accurate results for sub-1 micron epi-layers.

SUMMARY OF THE INVENTION

The method and apparatus of the present invention provides an improved technique for non-destructively measuring sub-1 micron dopant profiles in a semiconductor. The invention enables one to determine the thickness of an epitaxial or implanted layer, the thickness of a transition layer between the film and a substrate, and the concentration of free carriers in the film and the substrate, without having to destroy the sample in the process. In addition, the method is applicable to any semiconductor structure where an optical contrast exists in the IR range, for example 50 to 7000 wavenumbers, due to the presence of free carriers created by the introduction of dopants. The invention is suitable for layers as thick as tens of microns and as thin as several angstroms ($Å=1E-8$ cm), and detects dopant concentrations as low as several E16 $cm^{-3}$. The method also corrects for instrument imperfections thereby yielding more accurate results.

In a first embodiment of the invention, a method is provided for determining at least one parameter of a semiconductor. The method starts by measuring an experimental reflectance spectrum of the semiconductor. An analytical model of the semiconductor is constructed having a film layer, a transition layer and a substrate layer. Next, optical constants $n_i$ and $k_i$ for the film layer, transition layer and substrate layer are expressed as a function of doping level. A profile of the transition layer is determined, and if an abrupt profile exists, the transition layer is not included in the semiconductor model. If a graded profile exists, the transition layer is further modeled as having a plurality of sections, wherein each of the sections is assigned an s-polarization matrix and a p-polarization matrix. An overall modeled reflectance spectrum is then calculated and the parameters therein are varied to achieve a best fit relationship with the experimental reflectance spectrum. Thus, the parameter of interest can be determined.

In a second embodiment of the invention, the method of the first embodiment is modified wherein a polarizer is used so that the experimental reflectance spectrum is derived from radiation of a known polarization. This reduces the effects of instrument imperfections on the experimental data and results in simplifying the overall reflectance model. The parameter of interest is then obtained in the same manner as in the first embodiment.

In a third embodiment of the invention, a method is provided wherein two polarizers and an achromatic retarder are used to obtain an experimental reflectance spectrum expressed as a function of amplitude and phase. An overall modeled reflectance spectrum is calculated as done in the first embodiment, however, additional computational steps are taken to express the modeled reflectance spectrum as a modeled amplitude and a modeled phase. The parameters of the modeled amplitude and modeled phase are varied to achieve a best fit with the experimental data, thereby determining the desired parameter.

DESCRIPTION OF THE SPECIFIC EMBODIMENTS

In several embodiments of the present invention, a procedure is defined wherein an experimental reflectance ($R_{exp}$) measurement is collected using an apparatus constructed according to the teachings of the present invention. A comprehensive parameterized analytical model reflectance ($R_{mod}$) is created containing parameters which model the residual instrument imperfections as well as quantities of interest, such as film thickness, dopant concentration and other quantities of interest. The $R_{mod}$ is derived from quantum physics and results in several improvements over the Drude model. For example, the $R_{mod}$ of the present invention provides better accuracy for characterizing small films. Additionally, the $R_{mod}$ is accurate over a wide range, approximately 200–6000 wavenumbers, and allows the use of more of the measured infrared radiation. This is particularly important at the low end of the spectrum, namely 200–1000 wavenumbers, where there is generally high optical contrast between the film and the substrate. Further, the $R_{mod}$ provides more accurate results when using substrates having low dopant concentrations. Once the $R_{mod}$ is created, a determination of the parameters is achieved by optimizing the $R_{mod}$ for the best possible fit to the experimental measurement $R_{exp}$.

Figure 1:
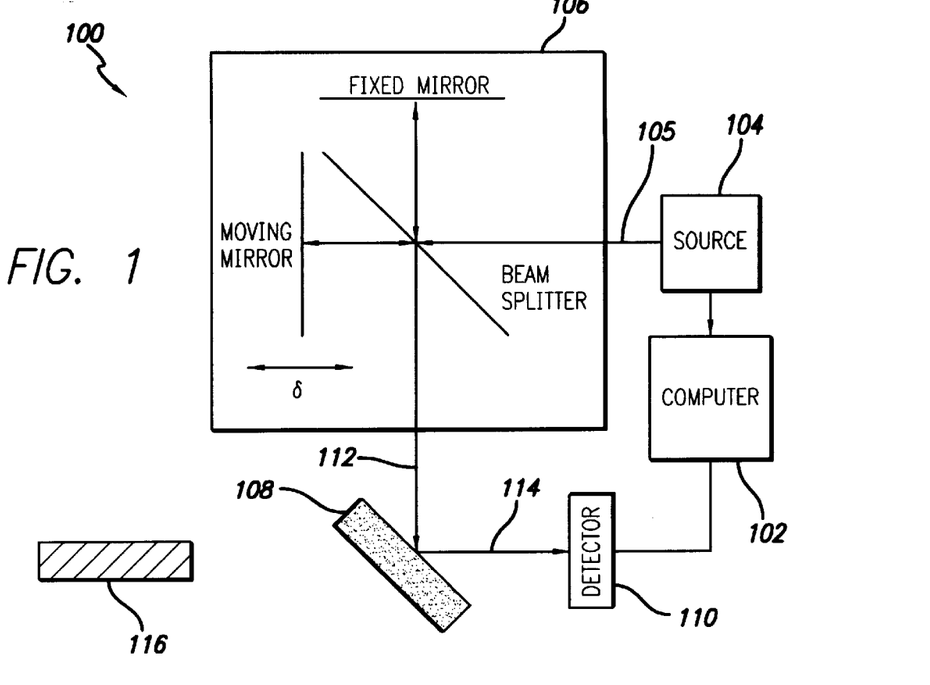
FIG. 1 shows an embodiment of the present invention.

FIG. 1 shows an embodiment of the present invention depicting a measurement apparatus 100. The measurement apparatus 100 comprises an FT-IR spectrometer which includes a computer 102, a radiation source 104, optics 106, a specimen holder 108 and a detector 110. When a specimen of interest is placed in the specimen holder 108, a measurement may be taken when the computer 102 commands the source 104 to emit source radiation 105 into the optics 106. The source radiation is partially coherent infrared radiation in the range of 200–6000 wavenumbers. The optics 106 redirects at least part of the source radiation to form an incident beam 112 directed towards the specimen in the specimen holder 108. A reflected beam 114 is formed when at least a portion of the incident beam 112 reflects off the specimen in the specimen holder 108. The detector 110 detects information from the reflected beam 114 and inputs the information to the computer 102. The computer 102 then performs various processing functions on the detected information allowing analysis of the specimen.

Included as part of the measurement apparatus 100 is a reference sample 116. The reference sample 116 comprises either a highly reflecting gold mirror or a highly polished silicon wafer having a high doping level, such as 1E19 cm$^{-3}$. The reference sample can be used to obtain ideal measurements which may be used for comparison or analysis of the measurements taken from the specimen of interest.

Figure 2:
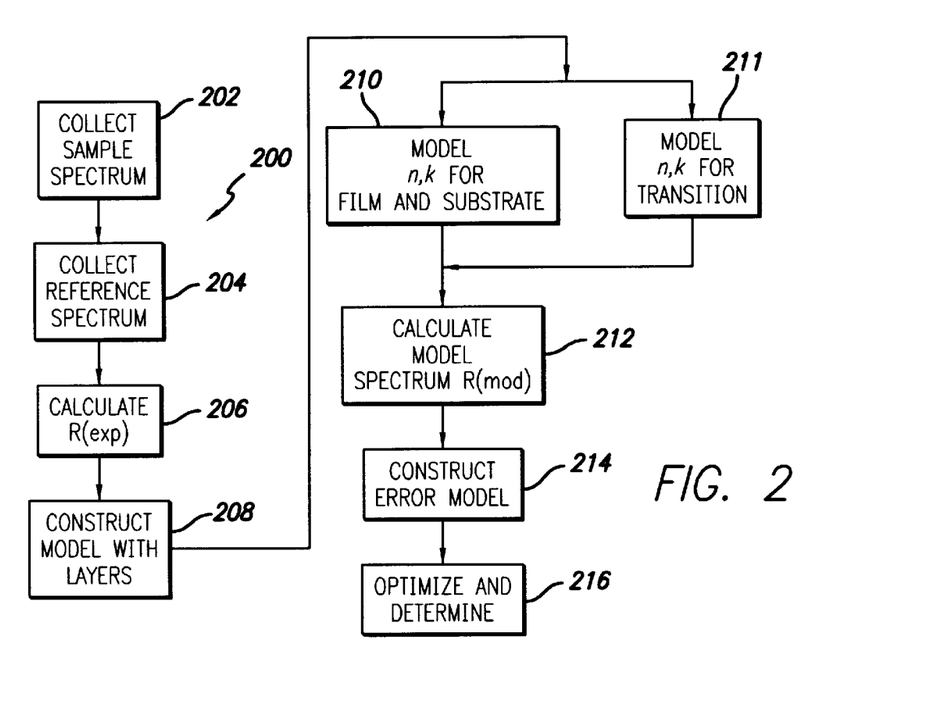
FIG. 2 shows a method of the present invention for use with the embodiment of FIG. 1.

FIG. 2 shows a flow chart for a measurement method 200 for non-destructively measuring the doping levels of a semiconductor material. The measurement method 200 comprises a number of steps wherein measurements of a specimen of semiconductor material and measurements of the reference 116 are analyzed.

In step 202 an infrared spectrum of the semiconductor material ($I_{samp}$) is taken. The semiconductor material is placed in the specimen holder 108 and the infrared spectrum consists of a measurement of the spectral intensity of the reflected beam 114 as a function of the wavenumber of the source radiation 105.

In step 204 the reference sample is placed in the specimen holder and an infrared spectrum of the reference sample ($I_{ref}$) is taken. The reference sample may be either the gold mirror or the highly polished silicon wafer.

In step 206 an experimental reflectance $R_{(exp)}$ is obtained according to the following equation:

$$R(\exp) = \frac{I_{samp}}{I_{ref}} \qquad (2)$$

In step 208 an analytical model of the semiconductor is constructed. The analytical model models the refractive properties of the semiconductor and contains parameters which represent quantities of interests, such as the thickness of a film layer.

Figure 3:
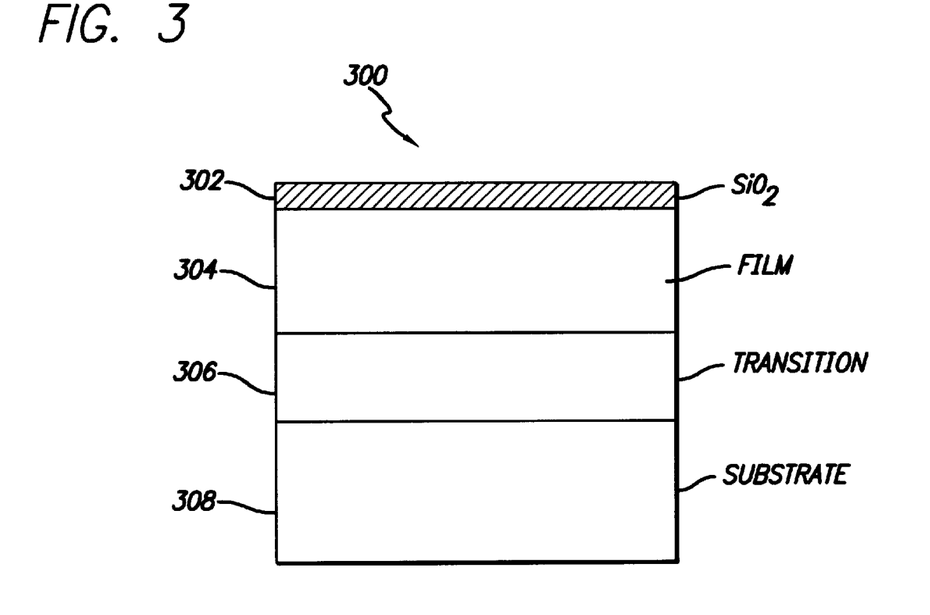
FIG. 3 shows a multi-stack model of a semiconductor sample.

FIG. 3 show a multi-stack analytical model 300 of the semiconductor constructed according to the teachings of the present invention. The multi-stack model 300 includes a layer of native oxide SiO$_2$ 302 having a thickness $d_0$, a film layer 304 having a doping level $N_1$ and having a thickness $d_1$, a transition layer 306 having a thickness $d_{tran}$ wherein a doping level having a depth profile exists and a substrate 308 having a doping level $N_2$. Although the model 300 is shown with only one film layer 304, it will be apparent to one with skill in the art that the model 300 may contain more than one film layer and that such additional layers could be modeled in a similar fashion to film layer 304.

Referring again to step 208, best guess initial values are assigned to the doping levels $N_1$, $N_2$ and the thickness values $d_{tran}$, $d_0$ and $d_1$ by the user. In addition, a doping profile of the transition layer 306 is modeled by a parameterized function $A(X_1, X_2)$, where initial values are assigned to the parameters $X_1$ and $X_2$ by the user based on generally known transition layer profiles. The initial values of the parameters form only a starting point from which more exact values will ultimately be determined.

Steps 210 and 211 define two respective representations of the refractive properties of the multi-stack model. The user determines which representation to construct based on whether the user desires the transition layer to have an abrupt profile or a graded profile. If the abrupt profile is selected, then the representation of step 210 is constructed wherein the transition layer is not included. If the graded profile is selected, then the representation of step 211 is constructed wherein the transition layer is included. In the following methods, the SiO$_2$ layer is not considered, since this layer is generally very thin and has relatively simple optical properties. However, it will be obvious to those of skill in the art that the SiO$_2$ layer can be easily included in the methods of the present invention without deviating from the scope of the invention.

In step 210, complex indices of refraction $n_i$ are constructed. Each $n_i$ corresponds to a layer in the multistack model 300 of FIG. 3 and comprises a pair of optical constants $n_i$ and $k_i$ according to the expression:

$$n_i = n_i + jk_i$$

In this step the user has defined the transition layer as having an abrupt profile, and as a result, the transition layer will not have an associated $n_i$. Thus, $n_i$ will be constructed only for the film layer 304 and the substrate 308. In a way distinct from the Drude model, equations derived from quantum physics are used to define the optical constants $n_i$ and $k_i$ associated with each $n_i$. By using this technique several advantages over the Drude model are derived. First, $n_i$ may be accurately defined for thinner films. Second, $n_i$ may be accurately defined for a greater radiation range, for example 250–6000 wavenumbers. Third, the technique is accurate when using substrates having lower dopant concentrations. Thus, with the above advantages, $n_i$ and $k_i$ are described as a function of the doping level in the corresponding regions according to the following equations:

$$n_i^2 = \frac{1}{2}\left(\sqrt{\varepsilon'^2 + \varepsilon''^2} + \varepsilon'\right) \qquad (3)$$

and $$k_i^2 = \frac{1}{2}\left(\sqrt{\varepsilon'^2 + \varepsilon''^2} - \varepsilon'\right)$$

where;

$$\varepsilon' = \frac{q}{3kT}\int dEg(E)\frac{\tau^2}{1+\omega^2\tau^2}|v|^2 f_0(1-f_0) \qquad (4)$$

and;

$$\varepsilon'' = \frac{q}{3kT}\int dEg(E)\frac{\tau/\omega}{1+\omega^2\tau^2}|v|^2 f_0(1-f_0) \qquad (5)$$

where;

$$|v|^2(E) = \frac{2}{m^*}E \qquad (6)$$

$$\frac{1}{\tau(E)} = \frac{Z^2 e^4 N_i}{16\pi(2m^*)^{1/2}\varepsilon^2 E^{3/2}}\ln\left\{1+\left[\frac{4\pi\varepsilon E}{Ze^2 N_i^{1/3}}\right]^2\right\} \qquad (8)$$

$$f_0 = \frac{1}{1+e^{-(E-E_f)/kT}} \qquad (9)$$

and $E_f$ is determined from the following constraint;

$$N_i = \int f_0 g(E)dE \qquad (10)$$

where $N_i$ is the doping level in the corresponding region, $v$ is the velocity of free carriers, $\tau$ is the free carrier scattering time and wherein $N_i$, $\tau$ and $\epsilon$ are determined recursively.

Once the pair of optical constants $n_i$ and $k_i$ for each of the film layer and the substrate have been calculated, a perpendicular reflectance ($R_s$) and a parallel reflectance ($R_p$) can be calculated according to the following equations.

$$R_s = r_s r_s^* \tag{11}$$

$$R_p = r_p r_p^* \tag{11a}$$

where;

$$r_p = \frac{r01p + r12pe^{-j2\beta}}{1 + r01p r12p e^{-j2\beta}} \tag{12}$$

$$r_s = \frac{r01s + r12se^{-j2\beta}}{1 + r01s r12s e^{-j2\beta}} \tag{13}$$

$$r01p = \frac{n1\cos\varphi 0 - n0\cos\varphi 1}{n1\cos\varphi 0 + n0\cos\varphi 1} \tag{14}$$

$$r12p = \frac{n1\cos\varphi 0 - n0\cos\varphi 2}{n1\cos\varphi 0 + n0\cos\varphi 2} \tag{15}$$

$$r01s = \frac{n1\cos\varphi 0 - n0\cos\varphi 1}{n1\cos\varphi 0 + n0\cos\varphi 1} \tag{16}$$

$$r12s = \frac{n1\cos\varphi 0 - n0\cos\varphi 2}{n1\cos\varphi 0 + n0\cos\varphi 2} \tag{17}$$

and $$\beta = 2\pi \left(\frac{\Delta}{\lambda}\right)(n1^2 - n0^2 \sin^2\varphi 0)^{1/2} \tag{18}$$

and $n_i$ are the respective complex indices of refraction in the corresponding material layer. For example, n0, n1, and n2 correspond to the complex refractive indices of the air, the film, and the substrate, respectively. For example, the index for the air is simply 1, the index of the film is typically 3.42 and the index of the substrate is derived depending on the carrier concentration according the quantum physics of Eqs.(3–10). The angles $\Phi 0$, $\Phi 1$, $\Phi 2$ refer to the complex angles of propagation of light in the air, the film and the substrate respectively. In calculating these angles, $\Phi 0$ is typically 30 degrees, but may be varied, while $\Phi 1$ and $\Phi 2$ are determined through Snell's law from the expressions:

$$n0 * \sin((\Phi 0)) = n1 * \sin(\Phi 1) \tag{18a}$$

and $$n0 * \sin(\Phi 0) = n2 * \sin(\Phi 2) \tag{18b}$$

In step 211 the user may select to represent the transition layer as having the graded profile. A transition layer reflectance model is created wherein the shape and thickness of the transition layer can then be determined.

Figure 4:
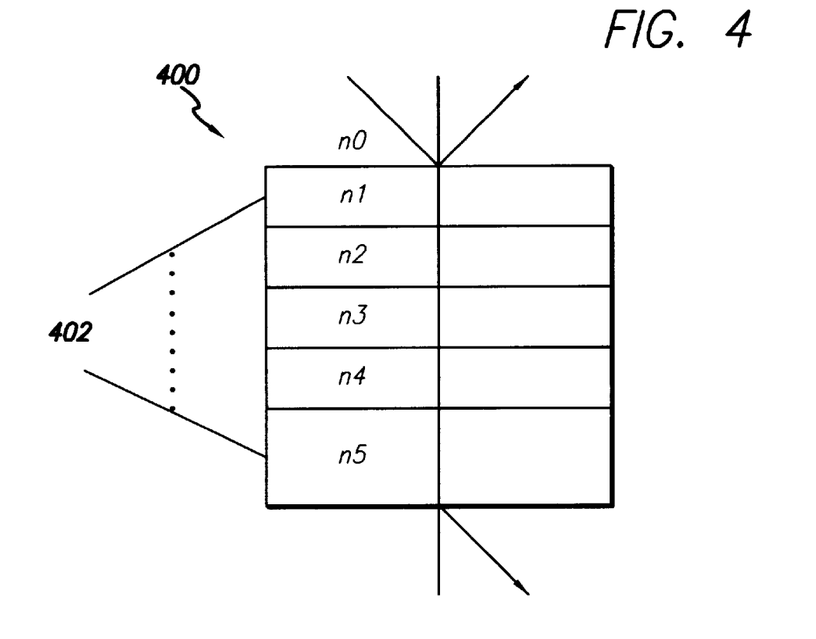
FIG. 4 shows a model of a transition layer.

FIG. 4 shows the transition layer reflectance model 400 used to model the transition layer 306. The model 400 represents the transition layer divided into a number of sections 402. The precise number of sections is determined by the user. Defining more section may yield more accurate results but may increase processing time. Defining fewer sections may yield less accurate results but may decrease processing time. Each section is assigned a transition characteristic matrix M, which for s-polarization is given by:

$$M_s = \begin{bmatrix} \cos\delta & -\frac{i}{p}\sin\delta \\ -ip\sin\delta & \cos\delta \end{bmatrix} \tag{19}$$

and for p-polarization is given by;

$$M_p = \begin{bmatrix} \cos\delta & -\frac{i}{q}\sin\delta \\ -iq\sin\delta & \cos\delta \end{bmatrix} \tag{20}$$

where;

$$\delta = 2\pi\sigma(n_i \cos \Phi_i)t$$

$$p = n_i \cos\Phi_i = \sqrt{n_i^2 - (n_0 \sin\theta_0)^2} \tag{21}$$

$$q = \frac{\cos\varphi_i}{n_i}$$

In the above equations, $\sigma$ is the wavenumber in cm$^{-1}$, $\theta$ is a complex angle of propagation in the section, t is the thickness of the section, $n_0$ is the refractive index in air, $\Phi_o$ is the angle of incidence in air (typically 30°) and $n_i$ is the complex index of refraction of the corresponding section defined by the quantum physics of Eqs. (3–10). The equations (18a) and (18b) are used to determine $\Phi_i$ from $\Phi_o$.

The overall transition characteristic matrices for the transition layer is given by the product of the individual matrices of each section, where n is the section number, as:

$$M_{s|p} = \prod_{i=1}^{n} M_i = \begin{bmatrix} tl_{11} & tl_{12} \\ tl_{21} & tl_{22} \end{bmatrix}_{s|p} \tag{22}$$

Utilizing the same technique, a characteristic matrix for the film layer can be defined as:

$$Mf_{s|p} = \begin{bmatrix} f11 & f12 \\ f21 & f22 \end{bmatrix} \tag{22a}$$

Thus, the overall characteristic matrices for the total model is given by the product of the film matrices and the transition matrices expressed as:

$$Mtot_{s|p} = M_{s|p} * Mf_{s|p} = \begin{bmatrix} m11 & m12 \\ m21 & m22 \end{bmatrix} \tag{22b}$$

In the above step it is possible to factor in the contribution of the $SiO_2$ layer by forming its characteristic matrix utilizing the same technique and multiplying it with the film and transition layer characteristic matrices of Eq. 22b.

Based on the total characteristic matrices the reflection coefficients from the sample for s-polarization are given by;

$$r_s = \frac{(m_{11} + m_{12}p_S)p_0 - (m_{21} + m_{22}p_S)}{(m_{11} + m_{12}p_S)p_0 + (m_{21} + m_{22}p_S)} \tag{23}$$

and the reflection coefficients from the sample for p-polarization are given by;

$$r_p = \frac{(m_{11} + m_{12}q_S)q_0 - (m_{21} + m_{22}q_S)}{(m_{11} + m_{12}q_S)q_0 + (m_{21} + m_{22}q_S)} \quad (24)$$

with $p_0$ and $p_s$ for the incident medium (air) and substrate, respectively, therein accounting for the effects of the substrate on the reflection coefficients.

The s and p polarized reflectances for the case of the transition layer having a graded profile are given by:

$$R_s = r_s r_s^* \quad (25)$$

$$R_p = r_p r_p^* \quad (25a)$$

Referring again to FIG. 2, in step 212 an overall reflectance for the model ($R_{mod}$) is obtained according to the selected transition layer modeling. If the abrupt profile was selected by the user then $R_s$ and $R_p$ from equations (11) and (11a) are used. If the graded profile was selected, then $R_s$ and $R_p$ from equations (25) and (25a) are used. As a result, the overall reflectance model can be expressed according to the following equation:

$$R_{mod} = R_s \xi(\alpha,\beta) + R_p \zeta(\alpha,\beta) \quad (26)$$

where $\xi$ and $\zeta$ are the frequency dependent parameterized functions containing polarization properties of the FT-IR instrument with the parameters $\alpha$ and $\beta$ to be determined during an upcoming step.

In step 214 an error function (MSE) is created and expressed as:

$$MSE = \sum_k [R_{exp} - R_{mod}(z)]^2 \quad (27)$$

where $R_{mod}(z)$ is the modeled reflectance spectrum of equation (26) and the quantity z is the vector of parameter values: $z = [N_1, N_2, d_0, d_1, d_{tran}, X_1, X_2, \alpha, \beta]$.

In step 216 an optimization and determination process is performed. To accomplish the optimization, the parameter vector z is varied according to a non-linear regression procedure, such as in the Levenberg-Marquart non-linear regression method, so as to minimize the MSE. Once the MSE is minimized, the corresponding vector z contains the parameters of interest, such as the thickness of the film layer.

Figure 5:
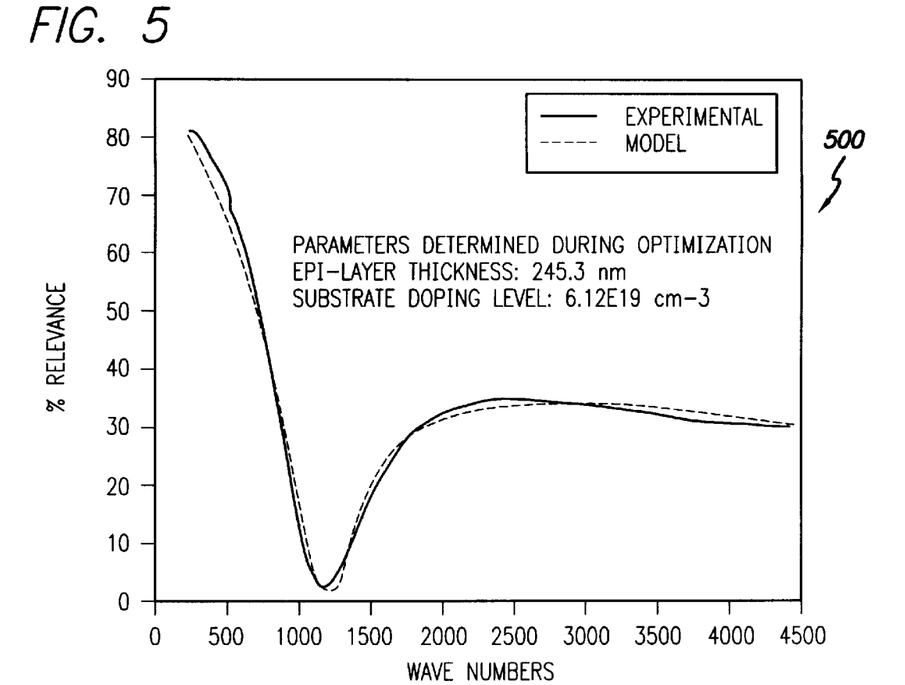
FIG. 5 shows results of the method of FIG. 2.

FIG. 5 shows an example of $R_{exp}$ and $R_{mod}$ values for a 0.2 μm epi-layer sample with an associated substrate layer. Graph 500 shows reflectance values versus wavenumbers wherein the $R_{exp}$ values are plotted as a solid line and the $R_{mod}$ values are plotted as a dotted line. The optimization step 216 in the measurement method 200 determined that for the known 0.2 μm epi-layer sample, the thickness of the epi-layer was 245.3 nm and the substrate doping level was $6.12E9$ cm$^{-3}$.

Figure 6:
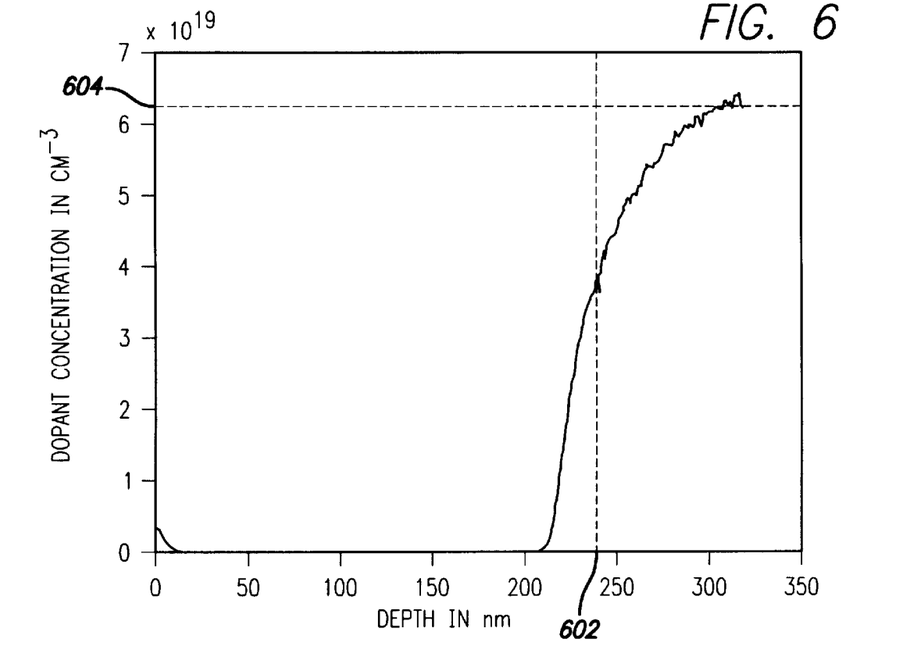
FIG. 6 shows results of a SIMS measurement.

FIG. 6 shows the results obtained when the same sample was measured using Secondary Ion Mass Spectroscopy (SIMS). SIMS is a destructive measurement technique wherein the sample is destroyed layer by layer as the measurements are taken. As can be seen at point 602, the depth of the epi-layer was approximately 240–250 nm. The substrate dopant concentration is shown at 604 and was approximately $6.1E19$ cm$^{-3}$. Thus, the two methods obtained approximately the same result while the measurement method 200 of the present invention did not destroy the sample as required by the SIMS technique.

Figure 7:
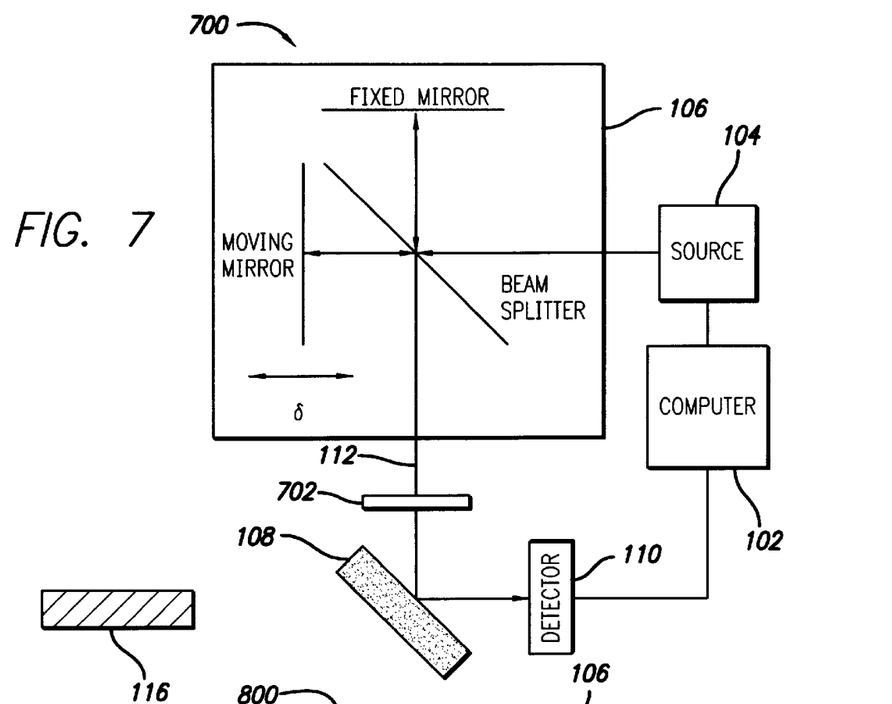
FIG. 7 shows another embodiment of the present invention.

FIG. 7 shows another embodiment of the present invention comprising a measurement apparatus 700 constructed according to the teachings of the present invention. The measurement apparatus 700 comprises the FT-IR spectrometer of FIG. 1 which includes the computer 102, source 104, optics 106, specimen holder 108 and the detector 110. The measurement apparatus 700 also includes the reference sample 116. Also included in the measurement apparatus 700 is an adjustable infrared polarizer 702. The adjustable infrared polarizer 702 is positioned between the optics 106 and the specimen holder 108, so it is in the path of the incident beam 112. The adjustable infrared polarizer 702 is used to set the state of polarization of the incident beam 112 to a selected value. Usually the selected value is either full p-polarization or full p-polarization, but maybe any combination of s and p polarization as desired. By setting the polarization of the incident beam 112, the effects of imperfections in the measurement apparatus 700 are eliminated, since the ratio of s and p polarization of the incident beam can be accurately set to known values. This serves to reduce the number of parameters in the optimization vector z by eliminating the parameters $\alpha$ and $\beta$, thereby increasing the robustness and accuracy of the measurements.

The measurement method 200 can be used with the measurement apparatus 700, however, the adjustable infrared polarizer 702 results in a simplification or variation in steps of the measurement method 200 as described below.

In the step 212 the value $R_{mod}$ in Eq. (26) is given by either $R_s$ or $R_p$ according to the polarization setting of the adjustable infrared polarizer 702. Thus, the parameters $\alpha$ and $\beta$ are removed from the optimization vector z as a result of using the adjustable infrared polarizer 702. For example, if the adjustable infrared polarizer 702 is set for full s-polarization, the $R_{mod}$ value is given by:

$$R_{mod} = R_s$$

If the adjustable infrared polarizer 702 is set for full p-polarization then the $R_{mod}$ value is given by:

$$R_{mod} = R_p$$

The values of $R_s$ and $R_p$ are determined as in the first embodiment wherein the user selects the profile of the transition layer and models the optical constants in either step 210 or step 211 accordingly.

The step 214 is performed as before, however, in the error function (MSE), $R_{mod}(z)$ is simplified and fewer parameters need to be resolved: $z = [N_1, N_2, d_0, d_1, d_{tran}, X_1, X_2]$.

Figure 8:
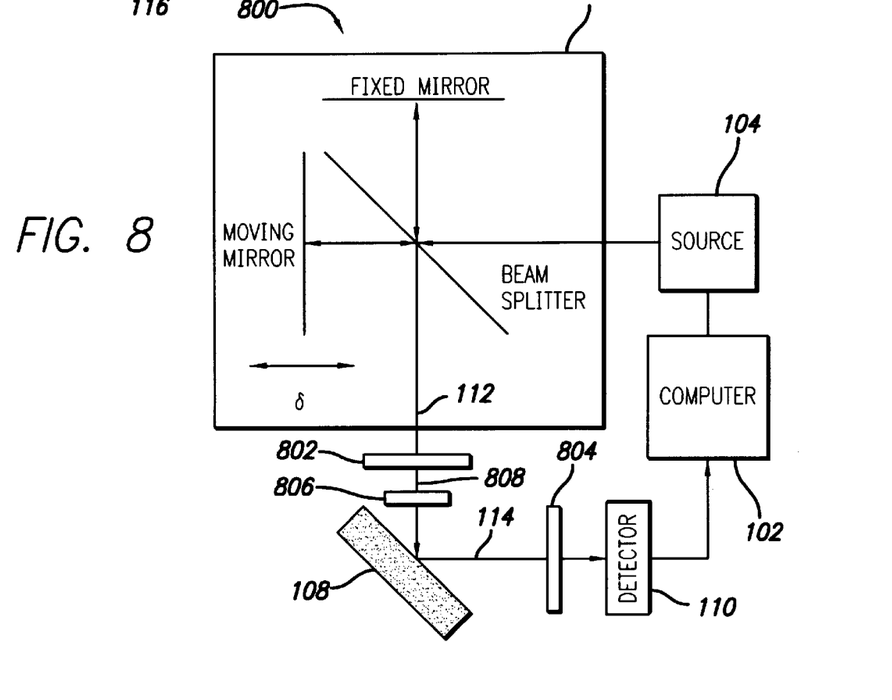
FIG. 8 shows another embodiment of the present invention.

FIG. 8 shows another embodiment of the present invention comprising a measurement apparatus 800 constructed according to the teachings of the present invention. The measurement apparatus 800 comprises the FT-IR spectrometer of FIG. 1 which includes the computer 102, source 104, optics 106, specimen holder 108 and the detector 110. The measurement apparatus 800 also includes a first adjustable infrared polarizer 802, a second adjustable infrared polarizer 804 and an achromatic phase retarder 806. The first adjustable polarizer is located between the optics 106 and the specimen holder 108 and in the path of an incident beam 112. The achromatic phase retarder 806 is located between the first adjustable polarizer 802 and the specimen holder 108 and in the path of a polarized beam 808. The second adjustable polarizer 804 is located between the specimen holder 108 and the detector 110 and in the path of the reflected beam 114.

Figure 9:
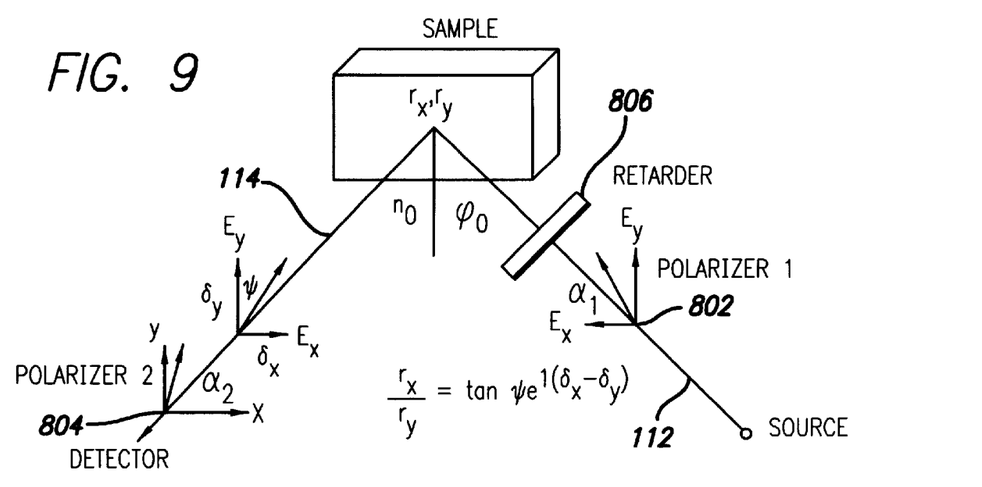
FIG. 9 shows another method of the present invention for use with the embodiment of FIG. 8.

FIG. 9 shows a detailed diagram of the radiation path from the optics 106 to the detector 110 of the embodiment of FIG. 8. In FIG. 9 therein is depicted the operation of polarizer 812, polarizer 814 and phase retarder 816. Also shown are the incident beam 818 and the reflected beam 822.

Figure 10:
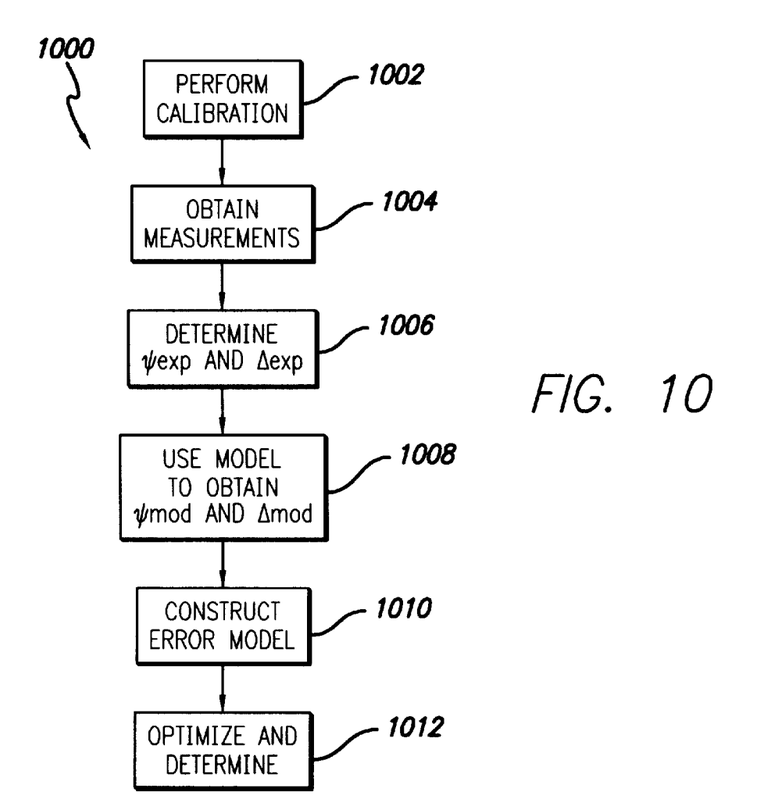
FIG. 10 shows a detailed diagram of the embodiment of FIG. 8.

FIG. 10 shows a measurement method 1000 for non-destructively measuring the doping levels of a semiconductor material utilizing the measurement apparatus 800. The method comprises 6 steps and is designed to accurately detect the change in the state of polarization between incident and reflected radiation from a sample of interest. The change of polarization is determined by measuring two quantities. The first quantity is $\tan\Psi$, which is the ratio of the amplitudes of the reflected p (parallel) and reflected s (perpendicular) polarized fields. The second quantity is $\Delta$, which is the phase difference between the reflected p and the reflected s polarized fields. By combining the two quantities, a combined complex quantity can be expressed as:

$$\mathrm{Tan}\Psi * e^{i\Delta} \quad (28)$$

In measurement method 1000, the reference sample 116 is eliminated while the accuracy of the measurement with respect to the parameters of interest is increased by 1 or more orders of magnitude.

In step 1002, an instrument calibration operation occurs. The sample is removed from the specimen holder 108 and the first polarizer 802 is set for 45° while the phase retarder is set to 0°. Four readings of intensity are collected at the detector 110 with the second polarizer 804 set to values of 0°, 45°, 90° and 135° respectively. These intensity readings will be referred to as $I_0(0)$, $I_0(45)$, $I_0(90)$ and $I_0(135)$, respectively, and are used to obtain the following relations:

$$\frac{I_0(0) - I_0(90)}{I_0(0) + I_0(90)} = (\cos 2\upsilon)\frac{s_1}{s_0} \quad (29)$$

$$\frac{I_0(45) - I_0(135)}{I_0(45) + I_0(135)} = (\cos^2 \upsilon) \quad (30)$$

In step 1004 a measurement operation occurs. The sample is inserted into the specimen holder 108 and the procedure of the step 1002 is repeated. This results in a set of four intensity spectra $I_s(0)$, $I_s(45)$, $I_s(90)$ and $I_s(135)$, respectively. From the measured intensity spectra, the following relations are obtained:

$$\frac{I_s(0) - I_S(90)}{I_s(0) + I_S(90)} = \frac{(\cos 2\psi - s_1/s_0)\cos 2\upsilon}{(1 - \cos 2\psi)s_1/s_0} = A \quad (31)$$

$$\frac{I_0(45) - I_0(135)}{I_0(45) + I_0(135)} = \frac{\cos^2 2\upsilon \sin 2\psi \cos\Delta}{1 - (\cos 2\psi \sin 2\upsilon)s_1/s_0} = B \quad (32)$$

In step 1006 the experimental relationships from the step 1004 are used to obtain expressions of the experimental amplitude ratio $\tan(\Psi_{exp})$ and the experimental phase shift $\Delta_{exp}$ as follows:

$$\cos 2\psi_{exp} = \frac{A - (\cos 2\upsilon)s_1/s_0}{(As_1/s_0) - \cos 2\upsilon} \quad (33)$$

$$\sin 2\psi_{exp}\cos\Delta_{exp} = \frac{B(1 - \cos 2\psi\sqrt{1-\cos^2 2\upsilon}\, s_1/s_0)}{\cos^2 2\upsilon} \quad (34)$$

Note that expression (34) is obtained with the phase retarder set to 0° which results in less sensitivity when measuring thin film layers. Equation (34a) results with the phase retarder set to 90° which provides more sensitivity when measuring thin film layers.

$$\sin 2\psi_{exp}\sin\Delta_{exp} = \frac{B(1 - \cos 2\psi\sqrt{1-\cos^2 2\upsilon}\, s_1/s_0)}{\cos^2 2\upsilon} \quad (34a)$$

Figure 11:
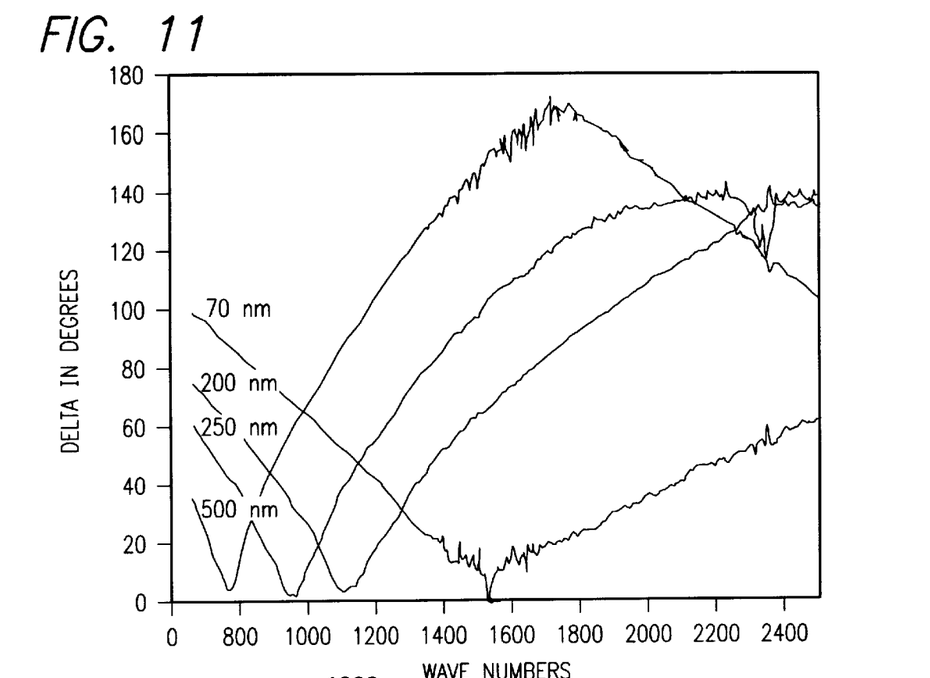
FIG. 11 shows a graph of $\Delta_{exp}$ for samples of various epi-layer thickness.

FIG. 11 shows measurements of the $\Delta_{exp}$ resulting from the above procedure for samples of various epi-layer thicknesses.

Referring again to FIG. 10, in step 1008 a reflectance model of the sample is calculated according to the steps 208, 210 and 211. Based on how the user selects to model the transition layer, the obtained reflection coefficients $r_s$ and $r_p$ from Eqs. (12–13) or Eqs. (23–24) are used to obtain a modeled amplitude ratio $\tan\Psi_{mod}$ and a modeled phase shift $\Delta_{mod}$ according to:

$$\psi_{mod(z)} = \tan^{-1}\left|\frac{r_p}{r_s}\right| \quad (35)$$

$$\Delta_{mod(z)} = phase\left(\frac{r_p}{r_s}\right) \quad (36)$$

In step 1010, an error function (MSE) is created and is defined as;

$$MSE = \sum_k [\psi_{exp} - \psi_{mod(z)}]^2 + \sum_k [\Delta_{exp} - \Delta_{mod(z)}]^2 \quad (37)$$

where $z=[N_1, N_2, d_0, d_1, d_{tran}, X_1, X_2]$.

In step 1020 an optimization and determination process is performed. To accomplish the optimization, the parameter vector z is varied according to a non-linear regression procedure, such as in the Levenberg-Marquart non-linear regression method, so as to minimize the MSE. Once the MSE is minimized, the corresponding vector z contains the parameters of interest, such as the dopant concentration levels.

Figure 12:
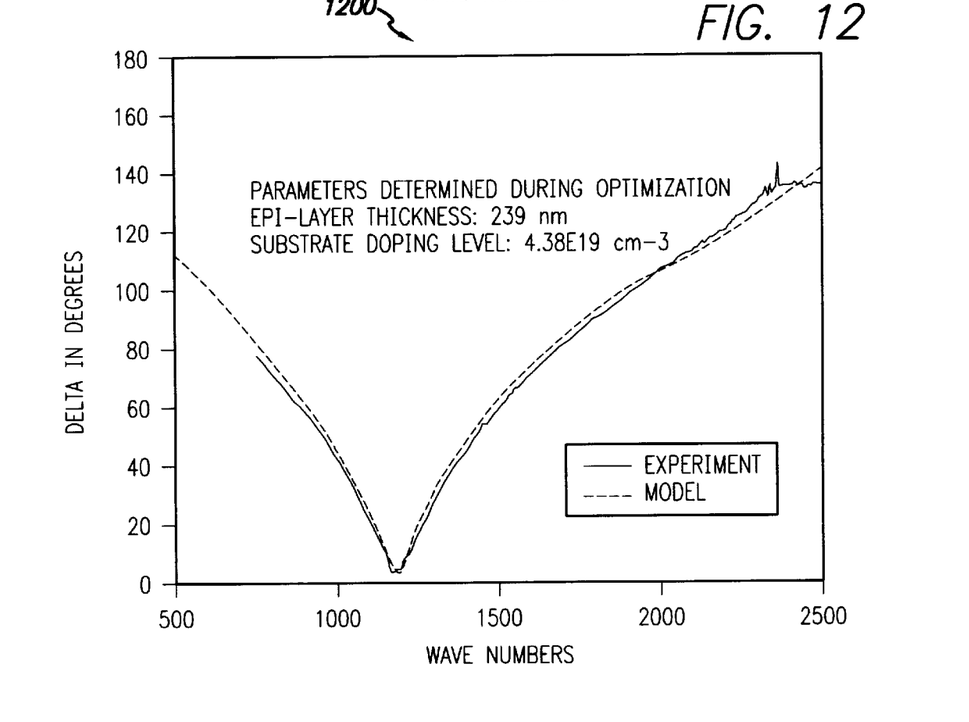
FIG. 12 shows a graph of $\Delta_{exp}$ and $\Delta_{mod}$ for a 0.2 $\mu$m epi-layer sample.

FIG. 12 shows an example of $\Delta_{exp}$ and $\Delta_{mod}$ values for a 0.2 µm epi-layer sample with an associated substrate layer. Graph 1200 shows the $\Delta$ values versus wavenumbers wherein the $\Delta_{exp}$ values are plotted as a solid line and the $\Delta_{mod}$ values are plotted as a dotted line. The optimization step 1020 in the measurement method 1000 determined that for the known 0.2 µm epi-layer sample, the thickness of the epi-layer was 239 nm and the substrate doping level was 4.38E19 cm$^{-3}$.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method for determining at least one parameter of a semiconductor, said method comprising the steps of:
   measuring an experimental reflectance spectrum $R_{exp}$ of the semiconductor utilizing an FT-IR instrument;
   constructing an analytical model of the semiconductor having a film layer, a transition layer and a substrate layer;
   modeling a perpendicular reflectance $R_s$ and a parallel reflectance $R_p$ of said analytical model;
   calculating a model reflectance spectrum $R_{mod}$ for said analytical model from said perpendicular reflectance $R_s$ and said parallel reflectance $R_p$;
   adjusting said model reflectance spectrum $R_{mod}$ to achieve a best fit relationship with said experimental reflectance spectrum $R_{exp}$, wherein an adjusted model reflectance spectrum is formed; and determining the at least one parameter from said adjusted model reflectance spectrum;

wherein said step of modeling comprises the steps of:

modeling a refractive index n comprising optical constants n and k for each of said film layer and said substrate layer, wherein a refractive matrix $n_i$ comprising optical constants $n_i$ and $k_i$ is formed;

calculating said optical constants $n_i$ and $k_i$ according to the following equations:

$$n_i^2 = \frac{1}{2}\left(\sqrt{\varepsilon'^2 + \varepsilon''^2} + \varepsilon'\right)$$

and $$k_i^2 = \frac{1}{2}\left(\sqrt{\varepsilon'^2 + \varepsilon''^2} - \varepsilon'\right),$$

wherein:

$$\varepsilon' = \frac{q}{3kT}\int dEg(E)\frac{\tau^2}{1+\omega^2\tau^2}|v|^2 f_0(1-f_0)$$

$$\varepsilon'' = \frac{q}{3kT}\int dEg(E)\frac{\tau/\omega}{1+\omega^2\tau^2}|v|^2 f_0(1-f_0)$$

$$|v|^2 = \frac{2}{m^*}E$$

$$g(E) = 1/2\pi^2(2m^*/\hbar^2)^{3/2}E^{1/2}$$

$$\frac{1}{\tau_i(E)} = \frac{Z^2 e^4 N_i}{16\pi(2m^*)^{1/2}\varepsilon^2 E^{3/2}}\ln\left\{1+\left[\frac{4\pi\varepsilon E}{Ze^2 N_i^{1/3}}\right]^2\right\}$$

$$f_0 = \frac{1}{1+e^{-(E-E_f)/kT}}$$

wherein $E_f$ is determined from the following constraint:

$$N_i = \int f_0 g(E) dE;$$

and modeling said perpendicular reflectance $R_s$ and said parallel reflectance $R_p$ according to the following equations:

$$R_s = r_s r_s^*$$

$$R_p = r_p r_p^*$$

$$r_p = \frac{r01p + r12pe^{-j2\beta}}{1+r01pr12pe^{-j2\beta}}$$

$$r_s = \frac{r01s + r12se^{-j2\beta}}{1+r01sr12se^{-j2\beta}}$$

$$r01p = \frac{n_1\cos\varphi_0 - n_0\cos\varphi_1}{n_1\cos\varphi_0 + n_0\cos\varphi_1}$$

$$r12p = \frac{n_1\cos\varphi_0 - n_0\cos\varphi_2}{n_1\cos\varphi_0 + n_0\cos\varphi_2}$$

$$r01s = \frac{n_1\cos\varphi_0 - n_0\cos\varphi_1}{n_1\cos\varphi_0 + n_0\cos\varphi_1}$$

$$r12s = \frac{n_1\cos\varphi_0 - n_0\cos\varphi_2}{n_1\cos\varphi_0 + n_0\cos\varphi_2}$$

and $$\beta = 2\pi\left(\frac{\Delta}{\lambda}\right)(n_1^2 - n_0^2\sin^2\varphi_0)^{1/2}.$$

2. The method of claim 1 wherein said step of calculating a model reflectance spectrum $R_{mod}$ comprises a step of calculating said model reflectance spectrum $R_{mod}$ according to the expression:

$$R_{mod} = R_s \xi(\alpha,\beta) + R_p \zeta(\alpha,\beta)$$

wherein $\xi$ and $\zeta$ are frequency dependent parameterized functions containing polarization properties of said FT-IR instrument.

3. The method of claim 2 wherein said step of adjusting said model reflectance spectrum comprises steps of:

defining an error function MSE according to the expression:

$$MSE = \sum_k [R_{exp} - R_{mod}(z)]^2$$

wherein z is a vector of parameter values comprising the at least one parameter; and varying z according to a non-linear regression procedure so as to minimize the value of MSE, wherein said adjusted model reflectance spectrum is formed.

4. The method of claim 3 wherein said step of measuring comprises steps of:

setting an irradiation source of said FT-IR instrument to irradiate radiation having only s polarization;

measuring a reflectance spectrum ($I_{samp}$) of the semiconductor utilizing said FT-IR instrument;

measuring a reflectance spectrum ($I_{ref}$) of a reference utilizing said FT-IR instrument; and computing an experimental reflectance spectrum $R_{exp}$ according to the expression:

$$R_{exp} = \frac{I_{samp}}{I_{ref}}.$$

5. The method of claim 3 wherein said step of measuring comprises steps of:

setting an irradiation source of said FT-IR instrument to irradiate radiation having only p polarization;

measuring a reflectance spectrum ($I_{samp}$) of the semiconductor utilizing said FT-IR instrument;

measuring a reflectance spectrum ($I_{ref}$) of a reference utilizing said FT-IR instrument; and computing an experimental reflectance spectrum $R_{exp}$ according to the expression:

$$R_{exp} = \frac{I_{samp}}{I_{ref}}.$$

6. The method of claim 1, wherein said step of measuring comprises the steps of:

measuring a reflectance spectrum ($I_{samp}$) of the semiconductor utilizing said FT-IR instrument;

measuring a reflectance spectrum ($I_{ref}$) of a reference utilizing said FT-IR instrument; and computing an experimental reflectance spectrum $R_{exp}$ according to the expression:

$$R_{exp} = \frac{I_{samp}}{I_{ref}}.$$

7. A method for determining at least one parameter of a semiconductor, said method comprising the steps of:

measuring an experimental reflectance spectrum $R_{exp}$ of the semiconductor utilizing an FT-IR instrument;

constructing an analytical model of the semiconductor having a-film layer, a transition layer and a substrate layer;

modeling a perpendicular reflectance $R_s$ and a parallel reflectance $R_p$ of said analytical model;

calculating a model reflectance spectrum $R_{mod}$ for said analytical model from said perpendicular reflectance $R_s$ and said parallel reflectance $R_p$;

adjusting said model reflectance spectrum $R_{mod}$ to achieve a best fit relationship with said experimental reflectance spectrum $R_{exp}$, wherein an adjusted model reflectance spectrum is formed; and determining the at least one parameter from said adjusted model reflectance spectrum;

wherein said step of modeling comprises the steps of:

modeling said transition layer as a plurality of sections;

modeling a refractive index n comprising optical constants n and k for each of said plurality of sections, wherein a refractive matrix $n_i$ comprising optical constants $n_i$ and $k_i$ is formed according to the following equations:

$$n_i^2 = \frac{1}{2}\left(\sqrt{\varepsilon'^2 + \varepsilon''^2} + \varepsilon'\right)$$

and $$k_i^2 = \frac{1}{2}\left(\sqrt{\varepsilon'^2 + \varepsilon''^2} - \varepsilon'\right),$$

wherein:

$$\varepsilon' = \frac{q}{3kT}\int dEg(E)\frac{\tau^2}{1+\omega^2\tau^2}|v|^2 f_0(1-f_0)$$

$$\varepsilon'' = \frac{q}{3kT}\int dEg(E)\frac{\tau/\omega}{1+\omega^2\tau^2}|v|^2 f_0(1-f_0)$$

$$|v|^2 = \frac{2}{m^*}E$$

$$g(E) = 1/2\pi^2(2m^*/\hbar^2)^{3/2}E^{1/2}$$

$$\frac{1}{\tau_i(E)} = \frac{Z^2 e^4 N_i}{16\pi(2m^*)^{1/2}\varepsilon^2 E^{3/2}}\ln\left\{1+\left[\frac{4\pi\varepsilon E}{Ze^2 N_i^{1/3}}\right]^2\right\}$$

$$f_0 = \frac{1}{1+e^{-(E-E_f)/kT}}$$

wherein $E_f$ is determined from the following constraint:

$$N_i = \int f_0 g(E) dE;$$

assigning a characteristic matrix $M_s$ and $M_p$ to each of said plurality of sections, wherein for s-polarization said $M_s$ is assigned according to:

$$M_s = \begin{bmatrix} \cos\delta & -\frac{i}{p}\sin\delta \\ -ip\sin\delta & \cos\delta \end{bmatrix}$$

and wherein for p-polarization said $M_p$ is assigned according to:

$$M_p = \begin{bmatrix} \cos\delta & -\frac{i}{q}\sin\delta \\ -iq\sin\delta & \cos\delta \end{bmatrix}$$

wherein:

$$\delta = 2\pi\sigma(n_i \cos\theta)t$$

$$p = n_i\cos\theta = \sqrt{n_i^2 - (n_0\sin\theta_0)^2}$$

$$q = \frac{\cos\theta}{n_i};$$

defining an overall characteristic metric $M_{s/p}$ for said transition layer as the product of all said M characteristic matrices according to:

$$M_{s/p} = \prod_{i=1}^{n} M_i = \begin{bmatrix} tl_{11} & tl_{12} \\ tl_{21} & tl_{22} \end{bmatrix}_{s/p};$$

assigning a characteristic matrix $Mf_{s/p}$ for said film layer according to:

$$Mf_{s/p} = \begin{bmatrix} f11 & f12 \\ f21 & f22 \end{bmatrix};$$

calculating an overall characteristic matrix $Mtot_{s/p}$ for said analytical model as the product of said $M_{s/p}$ and said $Mf_{s/p}$ according to:

$$Mtot_{s/p} = M_{s/p} * Mf_{s/p} = \begin{bmatrix} m11 & m12 \\ m21 & m22 \end{bmatrix};$$

calculating a reflection coefficient $r_s$ for s-polarization given by:

$$r_s = \frac{(m_{11} + m_{12}p_s)p_0 - (m_{21} + m_{22}p_s)}{(m_{11} + m_{12}p_s)p_0 + (m_{21} + m_{22}p_s)};$$

calculating a reflection coefficient $r_p$ for p-polarization given by:

$$r_p = \frac{(m_{11} + m_{12}q_s)q_0 - (m_{21} + m_{22}q_s)}{(m_{11} + m_{12}q_s)q_0 + (m_{21} + m_{22}q_s)}; \text{ and}$$

modeling said perpendicular reflectance $R_s$ and said parallel reflectance $R_p$ according to:

$$R_s = r_s r_s^*$$

$$R_p = r_p r_p^*.$$

8. The method of claim 7 wherein said step of calculating a model reflectance spectrum $R_{mod}$ comprises a step of calculating said model reflectance spectrum $R_{mod}$ according to the expression:

$$R_{mod}=R_s\xi(\alpha,\beta)+R_p\zeta(\alpha,\beta)$$

wherein $\xi$ and $\zeta$ are frequency dependent parameterized functions containing polarization properties of said FT-IR instrument.

9. The method of claim 8 wherein said step of adjusting said model reflectance spectrum comprises steps of:

defining an error function MSE according to the expression:

$$MSE = \sum_k [R_{exp} - R_{mod}(z)]^2$$

wherein z is a vector of parameter values comprising the at least one parameter; and varying z according to a non-linear regression procedure so as to minimize the value of MSE, wherein said adjusted model reflectance spectrum is formed.

10. The method of claim 9 wherein said step of measuring comprises steps of:

setting an irradiation source of said FT-IR instrument to irradiate radiation having only s polarization;

measuring a reflectance spectrum (Isamp) of the semiconductor utilizing said FT-IR instrument;

measuring a reflectance spectrum (Iref) of a reference utilizing said FT-IR instrument; and computing an experimental reflectance spectrum $R_{exp}$ according to the expression:

$$R_{exp} = \frac{I_{samp}}{I_{ref}}.$$

11. The method of claim 9, wherein said step of measuring comprises the steps of:

setting an irradiation source of said FT-IR instrument to irradiate radiation having only p polarization;

measuring a reflectance spectrum ($I_{samp}$) of the semiconductor utilizing said FT-IR instrument;

measuring a reflectance spectrum ($I_{ref}$) of a reference utilizing said FT-IR instrument; and computing an experimental reflectance spectrum $R_{exp}$ according to the expression:

$$R_{exp} = \frac{I_{samp}}{I_{ref}}.$$

12. A method for determining at least one parameter of a semiconductor comprising the steps of:

measuring an experimental amplitude $\Psi_{exp}$ and an experimental phase $\Delta_{exp}$ of the semiconductor utilizing an FT-IR instrument;

constructing an analytical model of the semiconductor having a film layer, a transition layer and a substrate layer;

modeling reflection coefficients $r_s$ and $r_p$ of said analytical model;

calculating a modeled amplitude $\Psi_{mod}$ and a modeled phase $\Delta_{mod}$ from said reflection coefficients $r_s$ and $r_p$;

adjusting said modeled amplitude $\Psi_{mod}$ and said modeled phase $\Delta_{mod}$ to achieve a best fit relationship with said experimental amplitude $\Psi_{exp}$ and said experimental phase $\Delta_{exp}$, respectively, wherein an adjusted model amplitude and an adjusted model phase are created; and determining the at least one parameter from said adjusted model amplitude and said adjusted model phase.

13. The method of claim 12 wherein said step of measuring comprises steps of:

measuring calibration intensity spectra $I_o(0)$, $I_o(45)$, $I_o(90)$ and $I_o(135)$;

measuring sample intensity spectra $I_s(0)$, $I_s(45)$, $I_s(90)$ and $I_s(135)$;

forming A and B experimental relationships according to the expressions:

$$\frac{I_s(0) - I_s(90)}{I_s(0) + I_s(90)} = \frac{(\cos2\psi - s_1/s_0)\cos2\upsilon}{(1 - \cos2\psi)s_1/s_0} = A$$

$$\frac{I_0(45) - I_0(135)}{I_0(45) + I_0(135)} = \frac{\cos^2\upsilon\sin2\psi\cos\Delta}{1 - (\cos2\psi\sin2\upsilon)s_1/s_0} = B; \text{ and}$$

computing said experimental amplitude $\Psi_{exp}$ and said experimental phase $\Delta_{exp}$ according to the expressions:

$$\cos2\psi_{exp} = \frac{A - (\cos2\upsilon)s_1/s_0}{(As_1/s_0) - \cos2\upsilon}$$

$$\sin2\psi_{exp}\cos\Delta_{exp} = \frac{B(1 - \cos2\psi\sqrt{1-\cos^2 2\upsilon}\, s_1/s_0)}{\cos^2 2\upsilon}.$$

14. The method of claim 13 wherein said step of modeling comprises the steps of:

modeling a refractive index n comprising optical constants n and k for each of said film layer and said substrate layer, wherein a refractive matrix $n_i$ comprising optical constants $n_i$ and $k_i$ is formed;

calculating said optical constants $n_i$ and $k_i$ according to the following equations:

$$n_i^2 = \frac{1}{2}\left(\sqrt{\varepsilon'^2 + \varepsilon''^2} + \varepsilon'\right)$$

and $$k_i^2 = \frac{1}{2}\left(\sqrt{\varepsilon'^2 + \varepsilon''^2} - \varepsilon'\right),$$

wherein:

$$\varepsilon' = \frac{q}{3kT}\int dE g(E)\frac{\tau^2}{1+\omega^2\tau^2}|v|^2 f_0(1-f_0)$$

$$\varepsilon'' = \frac{q}{3kT}\int dE g(E)\frac{\tau/\omega}{1+\omega^2\tau^2}|v|^2 f_0(1-f_0)$$

$$|v|^2 = \frac{2}{m^*}E$$

$$g(E) = 1/2\pi^2(2m^*/\hbar^2)^{3/2}E^{1/2}$$

$$\frac{1}{\tau_i(E)} = \frac{Z^2 e^4 N_i}{16\pi(2m^*)^{1/2}\varepsilon^2 E^{3/2}}\ln\left\{1+\left[\frac{4\pi\varepsilon E}{Ze^2 N_i^{1/3}}\right]^2\right\}$$

$$f_0 = \frac{1}{1+e^{-(E-E_f)/kT}}$$

wherein $E_f$ is determined from the following constraint:

$$N_i=\omega\int_0^\infty g(E)dE;$$

and modeling said reflection coefficients $r_s$ and $r_p$ according to the following equations:

$$r_p = \frac{r01p + r12p e^{-j2\beta}}{1 + r01p r12p e^{-j2\beta}}$$

$$r_s = \frac{r01s + r12s e^{-j2\beta}}{1 + r01s r12s e^{-j2\beta}}$$

$$r01p = \frac{n_1 \cos\varphi_0 - n_0 \cos\varphi_1}{n_1 \cos\varphi_0 + n_0 \cos\varphi_1}$$

$$r12p = \frac{n_1 \cos\varphi_0 - n_0 \cos\varphi_2}{n_1 \cos\varphi_0 + n_0 \cos\varphi_2}$$

$$r01s = \frac{n_1 \cos\varphi_0 - n_0 \cos\varphi_1}{n_1 \cos\varphi_0 + n_0 \cos\varphi_1}$$

$$r12s = \frac{n_1 \cos\varphi_0 - n_0 \cos\varphi_2}{n_1 \cos\varphi_0 + n_0 \cos\varphi_2}$$

and $$\beta = 2\pi\left(\frac{\Delta}{\lambda}\right)(n_1^2 - n_0^2 \sin^2\varphi_0)^{1/2}.$$

15. The method of claim 14 wherein said step of calculating a modeled amplitude and a modeled phase comprises a step of:

calculating said modeled amplitude $\Psi_{mod}$ and said modeled phase $\Delta_{mod}$ as a function of a parameter vector z according to the expressions:

$$\Psi_{mod(z)} = \tan^{-1}\left|\frac{r_p}{r_s}\right|$$

$$\Delta_{mod(z)} = phase\left(\frac{r_p}{r_s}\right)$$

wherein said parameter vector z comprises the at least one parameter.

16. The method of claim 15 wherein said step of adjusting comprises steps of:

defining an error function MSE expressed according to the equation:

$$MSE = \sum_k [\psi_{exp} - \psi_{mod(z)}]^2 + \sum_k [\Delta_{exp} - \Delta_{mod(z)}]^2; \text{ and}$$

varying said parameter vector z according to a non-linear regression procedure so as to minimize the value of said error function MSE, wherein said adjusted model amplitude and adjusted model phase are formed.

17. The method of claim 13 wherein said step of modeling comprises the steps of:

modeling said transition layer as a plurality of sections;

modeling a refractive index n comprising optical constants n and k for each of said plurality of sections, wherein a refractive matrix $n_i$ comprising optical constants $n_i$ and $k_i$ is formed according to the following equations:

$$n_i^2 = \frac{1}{2}\left(\sqrt{\varepsilon'^2 + \varepsilon''^2} + \varepsilon'\right)$$

and $$k_i^2 = \frac{1}{2}\left(\sqrt{\varepsilon'^2 + \varepsilon''^2} - \varepsilon'\right),$$

wherein:

$$\varepsilon' = \frac{q}{3kT} \int dE\, g(E) \frac{\tau^2}{1 + \omega^2 \tau^2} |v|^2 f_0 (1 - f_0)$$

$$\varepsilon'' = \frac{q}{3kT} \int dE\, g(E) \frac{\tau/\omega}{1 + \omega^2 \tau^2} |v|^2 f_0 (1 - f_0)$$

$$|v|^2 = \frac{2}{m^*} E$$

$$g(E) = 1/2\pi^2 (2m^*/\hbar^2)^{3/2} E^{1/2}$$

$$\frac{1}{\tau_i(E)} = \frac{Z^2 e^4 N_i}{16\pi (2m^*)^{1/2} \varepsilon^2 E^{3/2}} \ln\left\{1 + \left[\frac{4\pi\varepsilon E}{Ze^2 N_i^{1/3}}\right]^2\right\}$$

$$f_0 = \frac{1}{1 + e^{-(E - E_f)/kT}}$$

wherein $E_f$ is determined from the following constraint:

$$N_i = \int f_0 g(E) dE;$$

assigning a characteristic matrix $M_s$ and $M_p$ to each of said plurality of sections, wherein for s-polarization said $M_s$ is assigned according to:

$$M_s = \begin{bmatrix} \cos\delta & -\frac{i}{p}\sin\delta \\ -ip\sin\delta & \cos\delta \end{bmatrix}$$

and wherein for p-polarization said $M_p$ is assigned according to:

$$M_p = \begin{bmatrix} \cos\delta & -\frac{i}{q}\sin\delta \\ -iq\sin\delta & \cos\delta \end{bmatrix}$$

wherein:

$$\delta = 2\pi\sigma(n_i \cos\theta)t$$

$$p = n_i \cos\theta = \sqrt{n_i^2 - (n_0 \sin\theta_0)^2}$$

$$q = \frac{\cos\theta}{n_i};$$

defining an overall characteristic metric $M_{s/p}$ for said transition layer as the product of all said M characteristic matrices according to:

$$M_{s/p} = \prod_{i=1}^{n} M_i = \begin{bmatrix} tl_{11} & tl_{12} \\ tl_{21} & tl_{22} \end{bmatrix}_{s/p};$$

assigning a characteristic matrix $Mf_{s/p}$ for said film layer according to:

$$Mf_{s/p} \begin{bmatrix} f11 & f12 \\ f21 & f22 \end{bmatrix};$$

calculating an overall characteristic matrix $Mtot_{s/p}$ for said analytical model as the product of said $M_{s/p}$ and said $Mf_{s/p}$ according to:

$$Mtot_{s/p} = M_{s/p} * Mf_{s/p} = \begin{bmatrix} m11 & m12 \\ m21 & m22 \end{bmatrix};$$

modeling said reflection coefficient $r_s$ for s-polarization given by:

$$r_s = \frac{(m_{11}+m_{12}p_s)p_0 - (m_{21}+m_{22}p_s)}{(m_{11}+m_{12}p_s)p_0 + (m_{21}+m_{22}p_s)}; \text{ and}$$

modeling said reflection coefficient $r_p$ for p-polarization given by:

$$r_p = \frac{(m_{11}+m_{12}q_s)q_0 - (m_{21}+m_{22}q_s)}{(m_{11}+m_{12}q_s)q_0 + (m_{21}+m_{22}q_s)}.$$

18. The method of claim 17 wherein said step of calculating a modeled amplitude and a modeled phase comprises a step of:

calculating said modeled amplitude $\Psi_{mod}$ and said modeled phase $\Delta_{mod}$ as a function of a parameter vector z according to the expressions:

$$\Psi_{mod(z)} = \tan^{-1}\left|\frac{r_p}{r_s}\right|$$

$$\Delta_{mod(z)} = phase\left(\frac{r_p}{r_s}\right)$$

wherein said parameter vector z comprises the at least one parameter.

19. The method of claim 18 wherein said step of adjusting comprises steps of:

defining an error function MSE expressed according to the equation:

$$MSE = \sum_k [\psi_{exp} - \psi_{mod(z)}]^2 + \sum_k [\Delta_{exp} - \Delta_{mod(z)}]^2; \text{ and}$$

varying said parameter vector z according to a non-linear regression procedure so as to minimize the value of said error function MSE, wherein said adjusted model amplitude and adjusted model phase are formed.

20. Apparatus for determining at least one parameter of a semiconductor comprising:

a measuring means for measuring an experimental amplitude and an experimental phase of the semiconductor utilizing an FT-IR instrument;

a constructing means for constructing an analytical model of the semiconductor having a film layer, a transition layer and a substrate layer;

a modeling means for modeling reflectance coefficients $r_s$ and $r_p$ of said analytical model;

a calculating means for calculating a modeled amplitude and a modeled phase from said reflectance coefficients $r_s$ and $r_p$;

an adjusting means for adjusting said modeled amplitude and said modeled phase to achieve a best fit relationship with said experimental amplitude and said experimental phase, respectively, wherein an adjusted model amplitude and an adjusted model phase are created; and a determining means for determining the at least one parameter from said adjusted modeled amplitude and said adjusted modeled phase.

21. A method for calculating a reflection coefficient $r_s$ for s-polarization and a reflection coefficient $r_p$ for p-polarization of an analytical model of a semiconductor having a film layer, a transition layer and a substrate layer; said method comprising the steps of:

modeling a refractive index n comprising optical constants n and k for each of said film layer and said substrate layer, wherein a refractive matrix $n_i$ comprising optical constants $n_i$ and $k_i$ is formed;

calculating said optical constants $n_i$ and $k_i$ according to the following equations:

$$n_i^2 = \frac{1}{2}\left(\sqrt{\varepsilon'^2 + \varepsilon''^2} + \varepsilon'\right)$$

and $$k_i^2 = \frac{1}{2}\left(\sqrt{\varepsilon'^2 + \varepsilon''^2} - \varepsilon'\right),$$

wherein:

$$\varepsilon' = \frac{q}{3kT}\int dEg(E)\frac{\tau^2}{1+\omega^2\tau^2}|v|^2 f_0(1-f_0)$$

$$\varepsilon'' = \frac{q}{3kT}\int dEg(E)\frac{\tau/\omega}{1+\omega^2\tau^2}|v|^2 f_0(1-f_0)$$

$$|v|^2 = \frac{2}{m^*}E$$

$$g(E) = 1/2\pi^2(2m^*/\hbar^2)^{3/2}E^{1/2}$$

$$\frac{1}{\tau_i(E)} = \frac{Z^2 e^4 N_i}{16\pi(2m^*)^{1/2}\varepsilon^2 E^{3/2}}\ln\left\{1 + \left[\frac{4\pi\varepsilon E}{Ze^2 N_i^{1/3}}\right]^2\right\}$$

$$f_0 = \frac{1}{1+e^{-(E-E_f)/kT}}$$

wherein $E_f$ is determined from the following constraint:

$$N_i = \int f_0 g(E)dE;$$

and calculating said reflection coefficient $r_s$ for s-polarization and said reflection coefficient $r_p$ for p-polarization according to the following equations:

$$r_p = \frac{r01p + r12pe^{-j2\beta}}{1 + r01pr12pe^{-j2\beta}}$$

$$r_s = \frac{r01s + r12se^{-j2\beta}}{1 + r01sr12se^{-j2\beta}},$$

wherein:

$$r01p = \frac{n_1\cos\varphi_0 - n_0\cos\varphi_1}{n_1\cos\varphi_0 + n_0\cos\varphi_1}$$

$$r12p = \frac{n_1\cos\varphi_0 - n_0\cos\varphi_2}{n_1\cos\varphi_0 + n_0\cos\varphi_2}$$

$$r01s = \frac{n_1\cos\varphi_0 - n_0\cos\varphi_1}{n_1\cos\varphi_0 + n_0\cos\varphi_1}$$

$$r12s = \frac{n_1\cos\varphi_0 - n_0\cos\varphi_2}{n_1\cos\varphi_0 + n_0\cos\varphi_2}$$

and $$\beta = 2\pi\left(\frac{\Delta}{\lambda}\right)(n_1^2 - n_0^2\sin^2\varphi_0)^{1/2}.$$

22. A method for calculating a reflection coefficient $r_s$ for s-polarization and a reflection coefficient $r_p$ for p-polarization of an analytical model of a semiconductor having a film layer, a transition layer modeled as a plurality of sections, and a substrate layer; said method comprising the steps of:

modeling a refractive index n comprising optical constants n and k for each of said plurality of sections, wherein a refractive matrix $n_i$ comprising optical constants $n_i$ and $k_i$ is formed according to the following equations:

$$n_i^2 = \frac{1}{2}\left(\sqrt{\varepsilon'^2 + \varepsilon''^2} + \varepsilon'\right)$$

and $$k_i^2 = \frac{1}{2}\left(\sqrt{\varepsilon'^2 + \varepsilon''^2} - \varepsilon'\right),$$

wherein:

$$\varepsilon' = \frac{q}{3kT}\int dEg(E)\frac{\tau^2}{1+\omega^2\tau^2}|v|^2 f_0(1-f_0)$$

$$\varepsilon'' = \frac{q}{3kT}\int dEg(E)\frac{\tau/\omega}{1+\omega^2\tau^2}|v|^2 f_0(1-f_0)$$

$$|v|^2 = \frac{2}{m^*}E$$

$$g(E) = 1/2\pi^2(2m^*/\hbar^2)^{3/2}E^{1/2}$$

$$\frac{1}{\tau_i(E)} = \frac{Z^2 e^4 N_i}{16\pi(2m^*)^{1/2}\varepsilon^2 E^{3/2}}\ln\left\{1+\left[\frac{4\pi\varepsilon E}{Ze^2 N_i^{1/3}}\right]^2\right\}$$

$$f_0 = \frac{1}{1+e^{-(E-E_f)/kT}}$$

wherein $E_f$ is determined from the following constraint:

$$N_i = \int f_0 g(E)dE;$$

assigning a characteristic matrix $M_s$ and $M_p$ to each of said plurality of sections, wherein for s-polarization said $M_s$ is assigned according to:

$$M_s = \begin{bmatrix} \cos\delta & -\frac{i}{p}\sin\delta \\ -ip\sin\delta & \cos\delta \end{bmatrix}$$

and wherein for p-polarization said $M_p$ is assigned according to:

$$M_p = \begin{bmatrix} \cos\delta & -\frac{i}{q}\sin\delta \\ -iq\sin\delta & \cos\delta \end{bmatrix}$$

wherein:

$$\delta = 2\pi\sigma(n_i \cos\theta)t$$

$$p = n_i\cos\theta = \sqrt{n_i^2 - (n_0\sin\theta_0)^2}$$

$$q = \frac{\cos\theta}{n_i};$$

defining an overall characteristic metric $M_{s/p}$ for said transition layer as the product of all said M characteristic matrices according to:

$$M_{s/p} = \prod_{i=1}^{n} M_i = \begin{bmatrix} tl_{11} & tl_{12} \\ tl_{21} & tl_{22} \end{bmatrix}_{s/p};$$

assigning a characteristic matrix $Mf_{s/p}$ for said film layer according to:

$$Mf_{s/p}\begin{bmatrix} f11 & f12 \\ f21 & f22 \end{bmatrix};$$

calculating an overall characteristic matrix $Mtot_{s/p}$ for said analytical model as the product of said $M_{s/p}$ and said $Mf_{s/p}$ according to:

$$Mtot_{s/p} = M_{s/p} * Mf_{s/p} = \begin{bmatrix} m11 & m12 \\ m21 & m22 \end{bmatrix};$$

calculating a reflection coefficient $r_s$ for s-polarization given by:

$$r_s = \frac{(m_{11} + m_{12}p_s)p_0 - (m_{21} + m_{22}p_s)}{(m_{11} + m_{12}p_s)p_0 + (m_{21} + m_{22}p_s)}; \text{ and}$$

calculating a reflection coefficient $r_p$ for p-polarization given by:

$$r_p = \frac{(m_{11} + m_{12}q_s)q_0 - (m_{21} + m_{22}q_s)}{(m_{11} + m_{12}q_s)q_0 + (m_{21} + m_{22}q_s)}.$$

* * * * *